Feb. 18, 1969  R. C. ZELLER  3,428,376
SPOKE-TYPE WHEEL
Filed Oct. 13, 1966
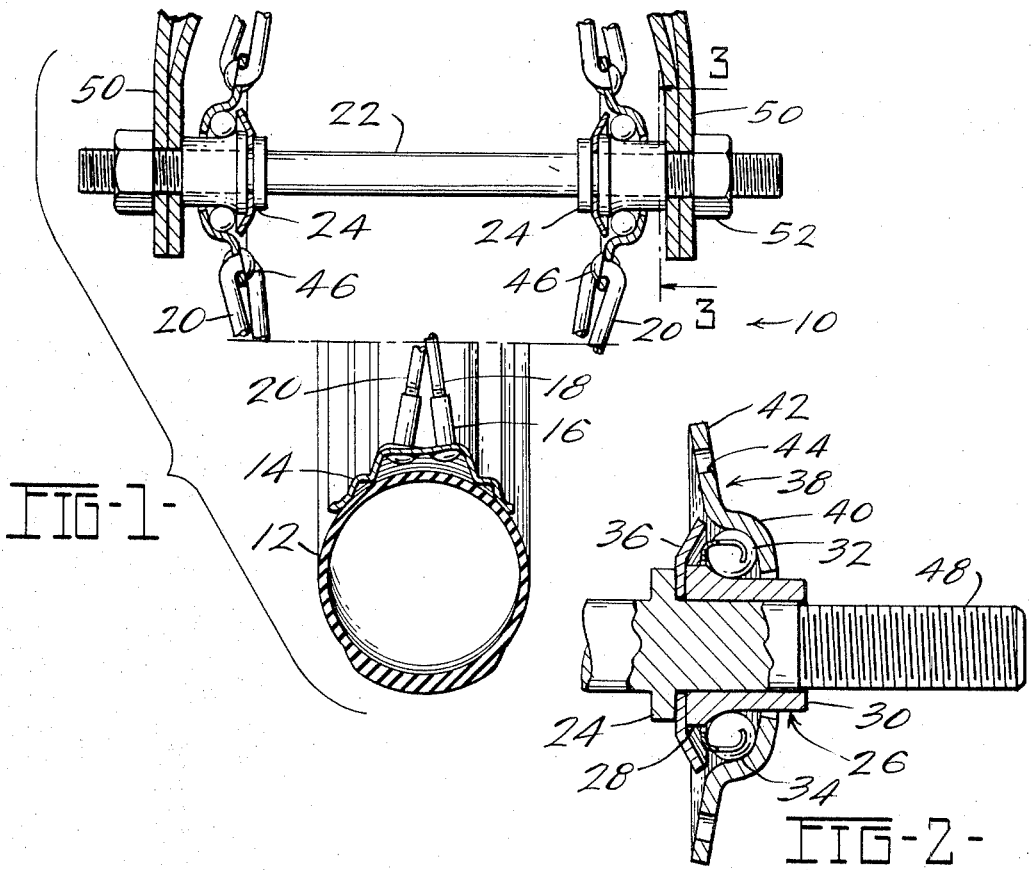
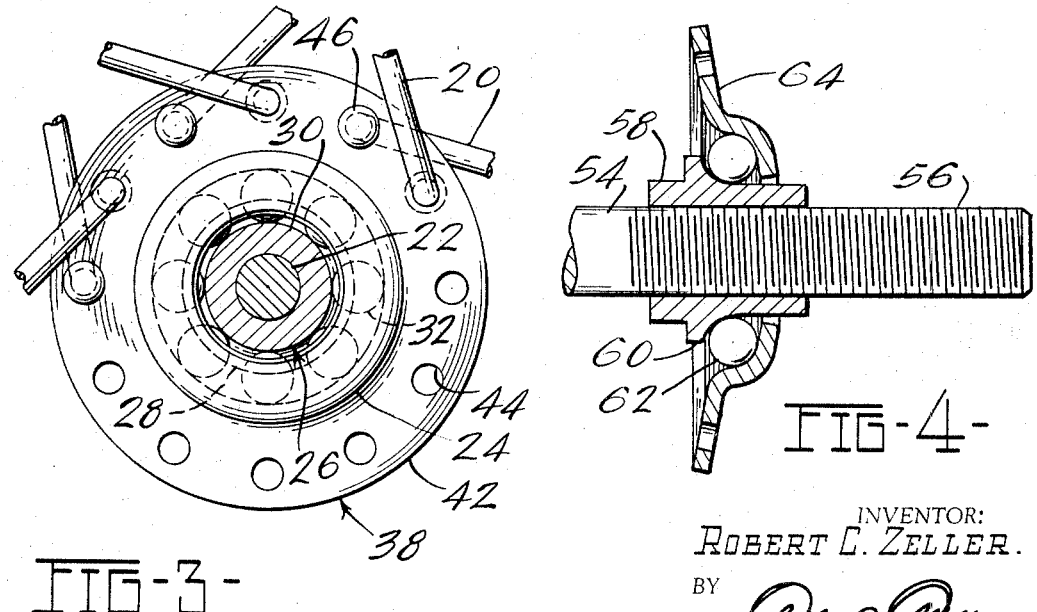
INVENTOR:
ROBERT C. ZELLER.
BY
ATT'YS.

United States Patent Office 3,428,376
Patented Feb. 18, 1969

3,428,376
SPOKE-TYPE WHEEL
Robert C. Zeller, Defiance, Ohio, assignor to The Zeller Corporation, Defiance, Ohio, a corporation of Ohio
Filed Oct. 13, 1966, Ser. No. 586,511
U.S. Cl. 308—190                                 8 Claims
Int. Cl. F16c 33/00

ABSTRACT OF THE DISCLOSURE

A hub construction for a spoke-type bicycle wheel features spoke rings forming independent outer bearing races mounted on inner races located on an axle. The outer bearing races are connected to spokes of the wheel and are independently movable axially so as to increase the force applied to bearing balls carried on the inner races when the load increases so that the wheel support is a function of the spoke tension and the wheel loading. In a preferred form, the inner races can be press fit on the axle but in another form, they can be threadedly mounted thereon for independent positioning to vary the initial tension on the spokes.

---

This invention relates to a wheel having spokes, as used on a bicycle, and particularly to a hub construction for a spoke-type wheel.

A wheel of the type with which the present invention is concerned has spokes connecting a hub and a rim in a manner such as to be under tension, with the degree of tension increasing as the load on the wheel increases. Probably the most common application of such wheels is for bicycles. The invention is specifically concerned with the construction of the hub of such spoke-type wheels, which hub is principally characterized by the bearing cones or inner races tapering outwardly, away from one another. The axle for the wheel has means associated therewith for maintaining the inner bearing races in spaced, fixed relationship, the spacing being sufficient that the spokes diverge in a direction from the rim of the wheel toward the hub. At the hub, the spokes are connected to spoke rings located around the inner bearing races and rotatably supported by bearing balls on the inner races. With this arrangement, when the load on the wheel is increased and the tension on the spokes is consequently increased, the spoke rings will be urged toward one another since the increased tension tends to urge the rings toward a common plane extending centrally through the rim and more specifically through the junctions of the spokes with the rim. The spoke rings thereby increase the force applied to the bearing balls in a direction toward the larger, inner ends of the bearing races. The bearings thereby provide full rotatable support for the wheel, which support is a function of the spoke tension and the wheel loading. This automatic adjustment of the bearing loading and tension provides correct and uniform bearing support under all wheel loads, and, consequently, increases the life of the bearing balls and bearing raceways. Further, the new hub structure involves fewer parts and thus can be manufactured less expensively. The inner bearing races also can be threaded on the axle, if desired, to enable the races to be centrally adjusted by turning them toward or away from one another, thereby to vary the initial tension on the spokes to any desired amount.

With the new hub construction, the inner bearing races can extend toward the ends of the axles beyond the spoke rings, which also form the outer races. When the wheel is assembled with the fork of a bicycle frame, for example, the assembly nuts then can be turned to any desired torque on the axles without changing the bearing loading, as has heretofore occurred. With previous hubs, if the nuts were not tightened sufficiently, the bearings could become loose or, if the nuts were tightened excessively, the bearing loading would be increased to the point that the races would be deformed and early bearing failure result. With the new construction, the assembly nuts do not contact the outer race or spoke ring at all, and the extent of tightening has no effect on the bearing loading. Further, with this construction, the usual spacer washers or rings can be eliminated thereby to enable the hub to have a slimmer, lightweight appearance.

It is, therefore, a principal object of the invention to provide an improved hub construction for a spoke-type wheel in which the spokes are under tension.

Another object of the invention is to provide a hub construction for a spoke-type wheel in which the bearing loading is a function of the wheel load to produce more uniform bearing support.

A further object of the invention is to provide a hub construction for a spoke-type wheel having the numerous advantages outlined above.

Many other objects and advantages of the invention will be apparent from the following detailed description of preferred embodiments thereof, reference being made to the accompanying drawings, in which:

FIG. 1 is a fragmentary view in vertical, transverse cross section of a spoke-type wheel including a hub according to the invention;

FIG. 2 is a greatly enlarged view in cross section of a portion of the hub shown in FIG. 1;

FIG. 3 is an enlarged side view in elevation taken along the line 3—3 of FIG. 1; and FIG. 4 is a view similar to FIG. 2 of a slightly modified construction.

Referring to FIG. 1, a spoke-type wheel embodying the invention is indicated at 10 with the wheel, in this instance, specifically being shown as used with a bicycle. The overall bicycle wheel includes a conventional tire 12 and a rim 14 having tension connecting nuts 16 mounted therein and receiving spokes 18 and 20. The tension nuts 16 can be turned by a small wrench to vary the tension on the individual spokes 18 and 20, as is well known in the art. The wheel 10 further includes an axle 22 having spaced annular shoulders 24 on the outer side of which are press-fitted inner bearing races or cones 26. These inner races taper outwardly away from one another, having inner annular large ends 28 and outer smaller ends 30. From the inner to the outer ends, as shown, the surfaces of the races taper more sharply at the beginning and then decrease so that the outer end portions of the bearing races are substantially cylindrical.

Bearing balls 32 are located around each of the bearing races 26 and are spaced apart by a suitable spacer ring or cage 34. An inner dust shield 36, in this embodiment, is located between the shoulder 24 of the axle and the bearing race 26 to aid in protecting the bearings on the inner race. A spoke ring 38 forms an outer bearing race portion 40 which is rotatably mounted on the bearing balls 32 and also has an annular flange portion 42 with suitable openings 44 therein to receive enlarged end portions 46 of the spokes 18 and 20.

The spokes 18 and 20 of the wheel 10 are under tension, with this tension varying with the load on the wheel, the tension increasing as the load increases. As the load increases and the tension increases, the spoke rings 38 tend to be pulled toward a central plane through the rim of the wheel, with more force thereby being placed on the ball 32 and the race 26 in proportion to the load. Hence, the bearing load becomes the function of the spoke tension and the wheel load and uniform bearing loading or support is thereby substantially maintained under all wheel loads. This enables the bearing ball and bearing raceway life to be extended considerably.

Also with the hub construction according to the invention, the outer small ends 30 of the inner bearing races 26 extend slightly beyond the beginning of outer threaded extensions 48 of the axle 22. With this arrangement, legs 50 of a frame or frame fork of a bicycle, in this instance, are mounted on the threaded ends 48 of the axle directly against the small ends 30 of the bearing races 26. Mounting nuts 52 are located immediately outside the frame 50, with no spacers, washers, or the like being necessary therebetween. Regardless of how tightly the mounting nuts 52 may be turned, the pressure on the bearing balls remains the same so that the bearing pressure cannot be increased excessively as has heretofore been possible. Without the spacers or washers, the hub construction also has a trim, lightweight appearance not achievable with conventional hubs.

A slightly modified hub bearing construction is shown in FIG. 4. In this instance, an axle 54 is of substantially uniform cross section throughout its length and terminates in longer threaded portions 56. A threaded inner bearing race 58 is mounted on each of the threaded portions 56. The bearing race 58 is similar to the race 26 except for the internal threaded passage and except for an even larger inner shoulder portion 60 which also serves as a dust shield for bearing balls 62. A spoke ring 64 is rotatably carried on the balls 62 and receives spokes in the same manner as the spoke ring 38. In this instance, the inner bearing races 58 can be threaded to a greater or lesser extent on the threaded portions 56 to decrease or increase tension on the spokes as the distance between the spoke rings changes. Otherwise, the bearing of FIG. 4 is similar to that of FIG. 2 insofar as objects and advantages thereof are concerned. Locking means or nuts can be provided adjacent the bearing races 58 to maintain their positions on the axle during use.

If desired, the bearing races actually can be an integral part of the axle, with the overall axle suitably case hardened in such an instance.

Various modifications of the above-described embodiments of the invention will be apparent to those skilled in the art, and it is to be understood that such modifications are within the scope of the invention, if they are within the spirit of the appended claims.

I claim:

1. A bearing hub assembly for a spoke-type wheel in which spokes are under tension with the tension increasing as the load on the wheel increases, said assembly comprising an axle, two inner bearing races mounted on said axle in spaced relationship, said races having tapered surfaces tapering away from one another, a plurality of bearing balls around each of said inner races in rolling contact therewith, and a spoke ring around each of said bearing races, rotatably carried on said bearing balls, and effective to retain said balls on said races, said spoke rings being separate, independent of one another, and unconnected to enable independent axial movement thereof on said inner bearing races.

2. A bearing hub assembly according to claim 1 characterized further by means for equally spacing apart said bearing balls around said inner races.

3. A bearing hub assembly according to claim 1 characterized further by means at inner, large ends of said inner races to aid in protecting said bearing balls on said inner races from dust and the like.

4. A bearing hub assembly according to claim 1 wherein said axle has a pair of fixed, spaced shoulders thereon and said bearing races are mounted on said axle beyond said shoulders toward the ends of said axle.

5. A bearing hub assembly according to claim 1 wherein outer, smaller ends of said inner bearing races extend through central openings in said spoke rings and over portions of threaded ends of said axle whereby when mounting nuts are turned onto said threaded ends of said axle to mount portions of a frame thereon, said frame portions engage the small ends of said inner bearing races and remain spaced from said spoke rings.

6. A spoke-type wheel for a bicycle comprising a rim, a bearing hub assembly comprising an axle, two spaced inner bearing races mounted on said axle on each side of a plane extending centrally through said rim, said races having tapered surfaces tapering away from one another, a plurality of bearing balls around each of said races in rolling contact therewith, spoke rings forming outer bearing races rotatably carried on said bearing balls, said spoke rings being separate, independent of one another, and unconnected to enable independent axial movement thereof on said inner bearing races, and spokes under tension carried by said rim and engaged with said spoke rings in a manner such that the tension on said spokes increases as the load on said axle increases.

7. A spoke-type wheel according to claim 6 characterized further by said axle having threaded, outer ends, said inner bearing races having small ends extending through central openings in said spoke rings and over inner portions of said threaded ends, legs of a bicycle frame fork being received on said threaded ends, and mounting nuts on said threaded ends outside of said frame fork legs and clamping said legs between said nuts and the small ends of said inner bearing races, said fork legs being spaced from said spoke rings.

8. A bearing hub assembly for a spoke-type wheel in which spokes are under tension with the tension increasing as load on the wheel increases, said assembly comprising an axle having threaded ends, two inner bearing races threadedly mounted on said threaded ends of said axle, said races having tapered surfaces tapering away from one another, a plurality of bearing balls around each of said inner races in rolling contact therewith, and a spoke ring around each of said bearing races, rotatably carried on said bearing balls, and effective to retain said balls on said races, said inner bearing races being capable of being turned toward and away from one another to vary tension on spokes connected to said spoke rings.

References Cited

UNITED STATES PATENTS

| 400,098 | 3/1889 | Marlin | 308—192 |
|---|---|---|---|
| 614,669 | 11/1898 | Snider et al. | 308—192 |
| 616,094 | 12/1898 | Farnell | 308—192 |
| 622,868 | 4/1899 | Simpson | 308—192 |
| 3,241,894 | 3/1966 | Duffy | 308—192 |

MARTIN P. SCHWADRON, *Primary Examiner.*

F. SUSKO, *Assistant Examiner.*